United States Patent
Willingham et al.

(10) Patent No.: US 6,240,290 B1
(45) Date of Patent: May 29, 2001

(54) BASE STATION HAND-OFF MECHANISM FOR CELLULAR COMMUNICATION SYSTEM

(75) Inventors: Julian Bartow Willingham, Melbourne; Gayle Patrick Martin, Merritt Island, both of FL (US); Gates H. Fortier, Calgary; Joseph A. Brasic, Cochrone, both of (CA)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/262,462

(22) Filed: Mar. 4, 1999

(51) Int. Cl.[7] .................................................. H04Q 7/20
(52) U.S. Cl. .......................... 455/436; 455/442; 455/440; 455/439
(58) Field of Search ..................................... 455/436, 437, 455/438, 439, 440, 441, 442, 443, 444, 453, 561, 562, 431, 432, 447, 456, 25

(56) References Cited

U.S. PATENT DOCUMENTS

| | | | |
|---|---|---|---|
| 5,559,806 | | 9/1996 | Kurby et al. ........................ 370/95.3 |
| 5,566,355 | | 10/1996 | Kanai ..................................... 445/25 |
| 5,596,333 | * | 1/1997 | Bruckert ................................ 342/457 |
| 5,603,089 | * | 2/1997 | Searle et al. .......................... 455/507 |
| 5,613,205 | | 3/1997 | Dufour ................................. 455/33.2 |
| 5,615,409 | | 3/1997 | Forssen et al. ..................... 455/33.1 |
| 6,038,459 | * | 3/2000 | Searle et al. ......................... 455/562 |
| 6,091,788 | * | 7/2000 | Keskitalo et al. ................... 455/561 |
| 6,104,926 | * | 8/2000 | Hogg et al. ........................... 455/431 |
| 6,151,502 | * | 11/2000 | Padovani et al. .................... 455/442 |
| 6,163,696 | * | 12/2000 | Bi et al. ................................ 455/436 |
| 6,167,286 | * | 12/2000 | Ward et al. ........................... 455/562 |

* cited by examiner

*Primary Examiner*—Nay Maung
*Assistant Examiner*—Sonny Trinh
(74) *Attorney, Agent, or Firm*—Allen, Dyer, Doppelt, Milbrath & Gilchrist, P.A.

(57) ABSTRACT

A channel hand-off control mechanism for a cellular communication network uses the same channels employed for communications between base stations of adjacent cells and a mobile transceiver, as the mobile transceiver moves between those cells, in order to locate the mobile transceiver relative to the base stations, so that the acquiring base station may readily place a narrowbeam channel on the mobile transceiver at hand-off. Each base station employs a phased array antenna, which allows the base station to controllably define its antenna coverage pattern with respect to any mobile transceiver, so as to minimize interference from one or more other transceivers, reducing frequency reuse distance.

32 Claims, 5 Drawing Sheets

BASE STATION HAND-OFF MECHANISM FOR CELLULAR COMMUNICATION SYSTEM

FIELD OF THE INVENTION

The present invention relates in general to cellular communication systems, and is particularly directed to a new and improved communication control mechanism for controlling the hand-off of frequency channels through which communications are conducted between base stations of adjacent cells and a mobile transceiver as the mobile transceiver moves between those cells.

BACKGROUND OF THE INVENTION

Wireless (cellular) communication service providers customarily supply wireless communication capability to (mobile) subscribers located within a geographic area, through the use of a relatively limited number of communication channels. In order to optimize coverage within the geographical area of interest, the service provider typically subdivides the area into a cluster or multiple clusters of base stations. In addition, in order to minimize interference from adjacent or nearby cells, the service provider may employ some form of frequency reallocation (or reuse) scheme, such as that described in the U.S. Pat. No. 4,144,496, as a non-limiting example.

In such a spatially distributed or 'cluster' network architecture, a fixed number of sectors (i) are served by a cluster of (k) base stations. This has the effect of subdividing the number of available channels N by the product of i and k, namely by (i*k). Unfortunately, with today's expanding traffic, particularly in densely populated urban areas, service providers face the eventuality of running out of channels to meet demand.

One solution is to construct more base stations and reduce power levels—which is both hardware intensive and expensive. Another scheme is to reuse channels in time (TDMA) or in frequency (CDMA). Other approaches, such as described in the above-referenced patent, include dynamic allocation of frequencies or channels to accommodate channel demand. Initially, the relatively poor efficiency of frequency allocation schemes was not a significant problem as the demand was small and the number of available channels was more than adequate. However, as demand increased, new channel assignment and frequency reuse strategies were developed.

Such schemes have included sectorization of cells to minimize interference, and dynamic allocation or 'borrowing' of channels from other cells with a cluster, to meet unbalanced demand within the cluster. A new and promising approach is to spatially separate channels using switched or steered antenna beams. The overall objective of any strategy is to maximize the number of channels available, subject to an acceptable carrier (C) to interference (I) ratio, with the current industry standard being a figure of merit (or C/I ratio) of 18 dB.

Sectorization is a technique that uses fixed beams formed by directional antenna (phased) arrays installed at the base stations to divide the cell into an integral number of smaller cells. This technique serves to reduce interference to the base station, by attenuating channel interference to those mobile subscribers who are not located in that sector's beam. It also reduces interference to the mobile subscriber, by attenuating channel interference from base stations transmitting in a direction that is predominately away from the location of the mobile subscriber. However, as the number of sectors increases, the number of channels per sector necessarily decreases, thereby reducing the figure of merit. Ideally, at the time of system installation, there would be no sectorization, which would greatly increase system capacity.

Regardless of the channel allocation mechanism employed, whenever a mobile subscriber moves from one cell to another, it is necessary to change the frequency channel used to conduct communications with the base station in the 'old' cell from which the mobile transceiver is departing to a new frequency channel used to conduct communications with the base station in the 'new' cell which the mobile transceiver is entering.

Techniques using steered beam antennas have unique problems accomplishing this handoff between cells. In particular, the 'new' cell has the problem of where to point its narrowbeam antenna. The mobile subscriber is waiting on transmission from the new base station to transmit on the new frequency. If the new base station points the beam in the wrong direction, then the mobile subscriber sees no signal, does not synchronize and does not transmit. After the elapse of a prescribed period of time with no communication, the call will be dropped. The problem then is for the new base station to determine the correct beam to the mobile subscriber.

One mechanism for performing such frequency channel reuse/reallocation (or hand-off from the previous base station to the new base station) is described in the U.S. Patent to Forssen et al, U.S. Pat. No. 5,615,409. This scheme involves the base station using an 'intermediate' channel to determine the direction of the mobile transceiver relative to it. It then assigns the mobile transceiver to an available narrowbeam channel. Because this technique requires what could otherwise be used for a regular communication channel be employed as an intermediate construct channel to determine the direction of the mobile transceiver, it necessarily reduces the number of available precious resources (channels).

SUMMARY OF THE INVENTION

In accordance with the present invention, this drawback is effectively obviated by a channel hand-off communication control mechanism that uses the very channels that are employed for communications between base stations of adjacent cells and a mobile transceiver as the mobile transceiver moves between those cells, to locate the mobile transceiver relative to the base stations, so that the acquiring base station may readily place a narrowbeam channel on the mobile transceiver at hand-off. Each base station employs a phased array antenna, which allows the base station to controllably define its antenna coverage pattern with respect to any mobile transceiver, so as to minimize interference from one or more other transceivers, and thereby reduce frequency reuse distance.

Pursuant to a first embodiment of the invention, when the quality of a narrowbeam link between the mobile subscriber and an already acquired cell base station indicates that the mobile transceiver is approaching a cell boundary with a new cell, the already acquired cell base station will initiate a hand-off sequence with the acquiring base station in the new cell to which the mobile subscriber is moving. For this purpose, the current base station will forward a message to the new base station that a channel hand-off is to commence. This hand-off initiating message will contain the identification of the communication channel currently employed by the mobile transceiver.

In response to this message, the acquiring base station employs one of the antenna elements of its phased array antenna to transmit an omnidirectional burst on a new communication channel to which mobile transceiver is to tune itself for conducting communications with the acquiring base station at hand-off, when the mobile transceiver enters cell. In response, this burst signal on the new channel, the mobile transceiver transmits a reply signal on the new channel, which is processed by the acquiring base station to derive a steering vector representative of the direction of the mobile transceiver relative to the new base station.

The new base station employs this derived steering vector to adjust the directivity pattern of its phased array antenna, so as to place a narrowbeam pattern of the new communication channel in the direction of mobile transceiver, completing the hand-off. The new base station proceeds to conduct narrow beam communications with the mobile transceiver on the new communication channel. Using its ability to control the directivity of the narrowbeam lobe by way of its phased array antenna, the new base station continues to communicate with and track the mobile transceiver as long as the mobile transceiver is located in the new cell.

In a second embodiment of the invention, the acquiring base station a 'sectorized' burst in place of an omni burst of the first embodiment to locate the mobile subscriber. This sectorized burst is confined to a prescribed spatial sector sourced from the new base station toward the current cell in which the mobile subscriber is currently located.

In a third embodiment of the invention, the base station of the current cell from which the mobile transceiver is about to depart into the new cell determines the direction of the mobile transceiver relative to the already acquired base station, and generates a first steering vector associated with this direction. This steering vector is conveyed as part of the hand-off initiating message to the new or acquiring base station. In response to this first steering vector message, the new base station generates a second steering vector, representative of the direction of the mobile transceiver relative to that base station for the new communication frequency channel to be used between the mobile transceiver and the new base station at channel hand-off. Using this second steering vector, the new base station adjusts the directivity pattern of its phased array antenna, so as to place a narrowbeam pattern of the new communication channel in the direction of the mobile transceiver.

When the mobile subscriber responds on the new channel, hand-off is complete between the base stations, and the mobile transceiver thereafter communicates with the second base station as it enters into and travels through the new cell. The new base station then proceeds to conduct narrow beam communications with the mobile transceiver on the new communication channel, using its phased array antenna to track and communicate with the mobile transceiver as long as the mobile transceiver is located in the new cell.

In a fourth embodiment of the invention, the new or acquiring base station 'pretunes' its transceiver to the 'old' or 'pre hand-off' frequency employed by the current or already acquired base station, in order to determine the direction of the mobile subscriber, prior to channel hand-off. In response to a pre hand-off message, the new base station uses its phased-array antenna to place a narrowbeam pattern for the current channel being employed by the already acquired base station in the general direction of the cell in which the mobile subscriber is currently located.

The new base station then monitors the current channel to derive a steering vector representative of the direction of the mobile transceiver relative to the new base station. At hand-off, the new base station employs the steering vector derived for the previous channel to place a narrowbeam lobe for the new channel in the direction of the mobile subscriber. When the mobile subscriber responds on the new narrowbeam channel, hand-off is complete between the base stations, and the mobile transceiver thereafter communicates with the new base station as it enters into and travels through new cell.

DETAILED DESCRIPTION

Before describing the frequency hand-off control mechanism in accordance with the present invention, it should be observed that the invention resides primarily in what is effectively a prescribed arrangement of conventional communication circuits and associated digital signal processing components and an attendant base station control program, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and associated flow charts of the supervisory base station control program are primarily intended to show the major components of the system in a convenient functional grouping and processing sequence, whereby the present invention may be more readily understood.

Figure 1:
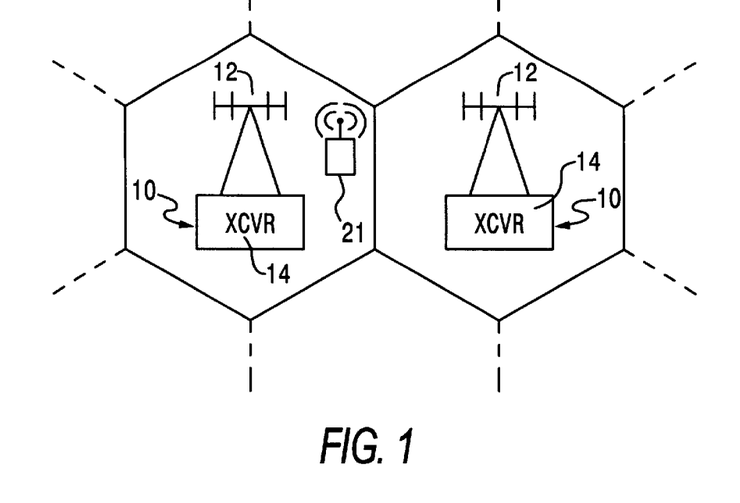
FIG. 1 diagrammatically illustrates adjacent cells of a cellular communication network, and associated base stations of which employ phased array antennas for narrowbeam communications with a mobile subscriber.

As described briefly above, and as diagrammatically illustrated in FIG. 1, pursuant to a first embodiment of the invention, each cell base station 10 employs a phased array antenna 12 to which transceiver equipment 14 of the base station is coupled. The use of a phased array antenna allows the base station to controllably define its antenna coverage pattern with respect to any mobile transceiver 21, which minimizes interference from one or more other transceivers, and thereby reduces frequency reuse distance.

Figure 2:
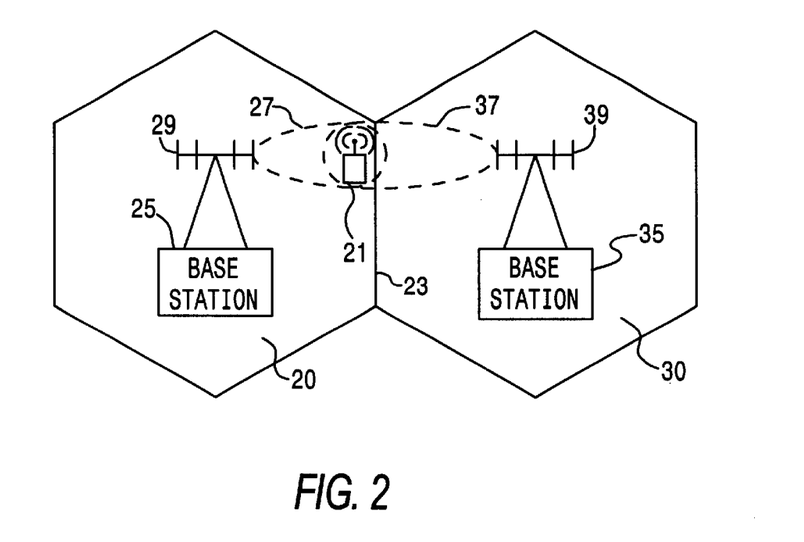
FIG. 2 is a cellular system diagram associated with a first 'omni' burst embodiment of the present invention.
Figure 3:
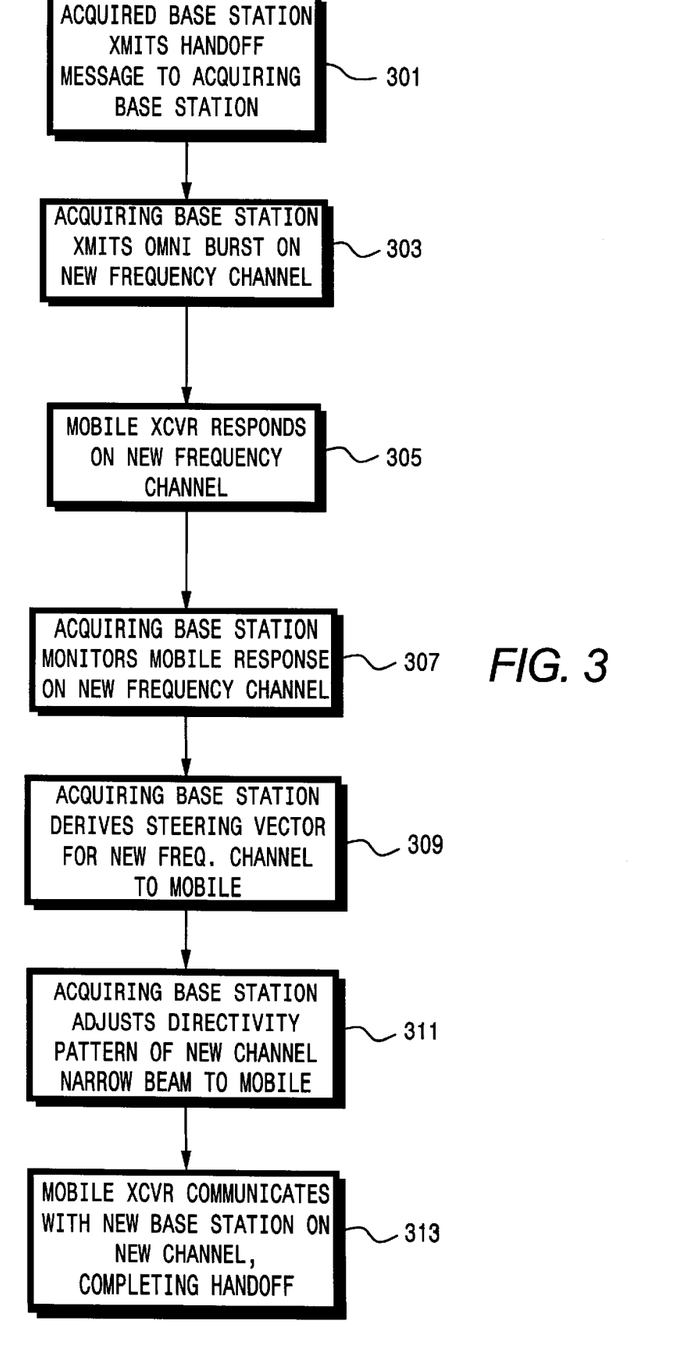
FIG. 3 sets forth a communication flow sequence associated with the 'omni' burst embodiment of FIG. 2.

OMNI BURST (FIGS. 2 and 3)

A first embodiment of the frequency allocation control mechanism of the present invention will now be described with reference to the mobile transceiver cellular system diagram of FIG. 2 and the communication flow sequence of FIG. 3. As shown in FIG. 2, a mobile transceiver 21 traveling through a first cell 20 is approaching the boundary 23 between cell 20 and a second (immediately adjacent) cell 30. As mobile transceiver 21 travels through the cell 20, it communicates with that cell's base station 25 over an assigned frequency channel.

The narrowbeam directivity pattern 27 of this channel is continually updated in the direction of the mobile transceiver 21 by means of an adjustable steering vector that controls the operation of the base station's phased array antenna 29. As a non-limiting, but preferred embodiment, each base station's phased array antenna may be configured as described in co-pending U.S. patent application Ser. No. 09/081,476, filed May 19, 1998, by R. Hildebrand et al, entitled: "Circular Phased Array Antenna Having Non-Uniform Angular Separations Between Successively Adjacent Elements," assigned to the assignee of the present application and the disclosure of which is incorporated herein.

In addition, although the steering vector algorithm is not limited to any particular implementation, non-limiting examples of the algorithm include the PSF algorithm described in U.S. Pat. No. 4,255,791 to P. Martin, entitled: "Signal Processing System," issued Mar. 10, 1981, and the "Maximum SNR Method," described in the text "Introduction to Adaptive Arrays," by R. Monzingo et al, published 1980, by Wiley and Sons, New York Alternatively, and in accordance with a preferred embodiment of the invention, the steering vector algorithm may execute a directivity pattern control mechanism of the type described in co-pending U.S. patent application Ser. No. 09/081,287, filed May 19, 1998, by Karen Halford et al, entitled: "Bootstrapped, Piecewise-Optimum Directivity Control Mechanism for Setting Weighting Coefficients of Phased Array Antenna, assigned to the assignee of the present application and the disclosure of which is incorporated herein.

In the course of base station 25 within cell 20 monitoring the quality of the link, when the quality measurement on the mobile transceiver 21 indicates that the transceiver is in the vicinity of the cell boundary 23, base station 25 initiates the communication sequence shown in FIG. 3 with base station 35 in the 'acquiring' cell 30. At step 301, using a dedicated inter base station communication control link, base station 25 forwards a message to the base station 35 that a channel hand-off is to commence.

This message will contain the identification of the communication channel currently employed by the transceiver 21. In response to this message, at step 303, base station 35 uses one of the antenna elements of its phased array antenna 39 to transmit an omnidirectional burst on the new communication channel to which mobile transceiver 21 is to tune itself for conducting communications with the base station 35, when the mobile transceiver enters cell 35. In a preferred embodiment, this broadbeam energy burst is set at a transmission power level of NP, where N is ratio of the average gain of the phased array antenna to the gain of a single antenna element of the phased array antenna, and P is the power at a single element required for the energy burst to close the communication link with the mobile transceiver 21 at cell boundary 23 at the full gain of the phased array antenna.

At step 305, in response to receipt of this signal, mobile transceiver 21 transmits a reply signal on the new channel. In step 307, base station 35 monitors the (omnidirectional) burst from the mobile transceiver by means of the full reception capability of its phased array antenna 39 base station 35. In step 309, it processes the received signal to determine the direction of the mobile transceiver 21 relative to the second base station 35. For this purpose, a steering vector signal processing mechanism of the type described above may be employed.

Having determined the direction of the mobile transceiver 21 relative to base station 35, in step 311, the base station 35 adjusts the directivity pattern 37 of its phased array antenna 39, so as to place a narrowbeam pattern of the new communication channel in the direction of mobile transceiver 21. The average power allocated to each element of the phased array antenna is equal to the above-described value of P.

Once it has completed hand-off of the mobile transceiver from the base station 25, and acquired the mobile transceiver 21, in step 313, base station 35 proceeds to conduct narrow beam communications with the mobile transceiver 21 on the new communication channel. Using its ability to control the directivity of the narrowbeam lobe by way of its phased array antenna, base station 35 continues to communicate with and track the mobile transceiver 21 as long as the mobile transceiver is located in the cell 30.

Figure 4:
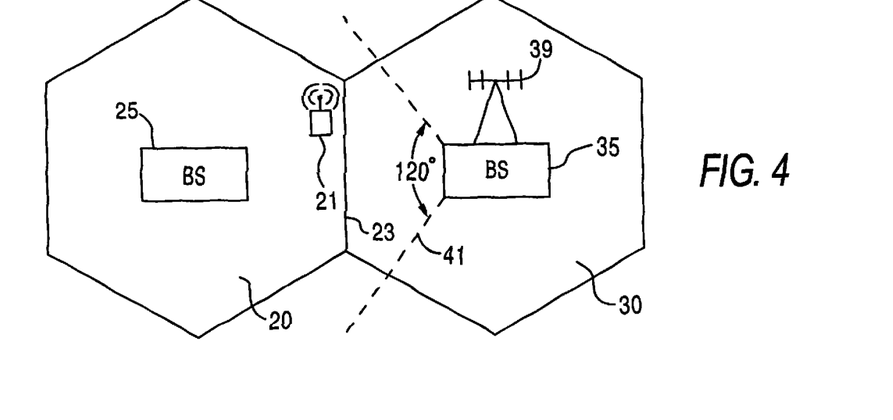
FIG. 4 is a cellular system diagram associated with a second 'sectorized' burst embodiment of the present invention.
Figure 5:
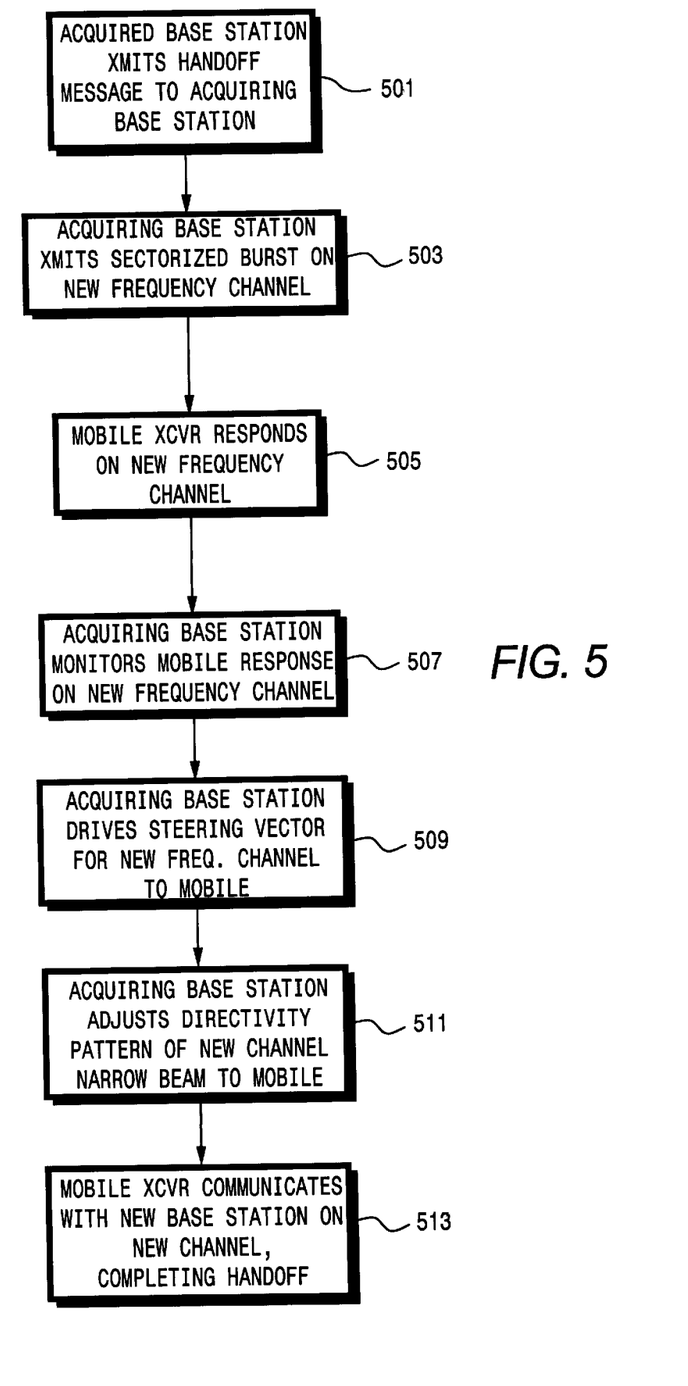
FIG. 5 is a communication flow sequence associated with the 'sectorized' burst embodiment of FIG. 4.

SECTORIZED BURST (FIGS. 4 and 5)

A modification of the first embodiment of the frequency allocation control mechanism of the present invention, which employs a sectorized beam, will be now described with reference to the mobile transceiver cellular system diagram of FIG. 4 and the communication flow sequence of FIG. 5. As in the embodiment shown in FIG. 2, as a mobile transceiver 21 traveling through a first cell 20 approaches the boundary 23 between cell 20 and a second (immediately adjacent) cell 30, the link quality measurement conducted by base station 25 or the mobile transceiver 21 will indicate that the mobile transceiver 21 is in the vicinity of the cell boundary 23, and base station 25 will initiate the communication sequence shown in FIG. 5 with base station 35.

At step 501, using the system backhaul, base station 25 forwards a message to base station 35 that a channel hand-off is to commence. As in the first embodiment, this message will contain the identification of the communication channel currently employed by the transceiver 21. In response to this message, at step 503, base station 35 employs its phased array antenna 39 to transmit a 'sectorized' burst on the new communication channel to which mobile transceiver 21 is to tune itself for conducting communications with the base station 35. As shown in FIG. 4, this sectorized burst is confined to a prescribed spatial sector 41 sourced from the base station 35 toward the cell 20. As a non-limiting example, sector 41 may subtend an angle of 120°, which is effective to encompass the geographical region containing the mobile transceiver 21.

The power level of this sectorized transmission is set at a transmission power level of NP/M, where N is ratio of the average gain of the phased array antenna to the gain of one antenna element of the phased array antenna, P is the power required for the energy burst to establish a communication link with the mobile transceiver 21 at the cell boundary 23 at the full gain of the phased array antenna, and M is the ratio of the angle subtended by the spatial sector to 360°.

At step 505, as in the first embodiment, in response to receipt of this signal, mobile transceiver 21 transmits a reply signal on the new channel. In step 507, base station 35 monitors the (omnidirectional) response from the mobile transceiver and then processes the received signal in step 509 to derive a steering vector representative of the direction of the mobile transceiver 21 relative to the second base station 35.

Having determined the direction of the mobile transceiver 21 relative to it, in step 511, the base station 35 adjusts the directivity pattern of its phased array antenna 39, so as to place a narrowbeam pattern of the new communication channel in the direction of mobile transceiver 21, just as in the first embodiment. In step 513, with channel hand-off completed, the second base station conducts narrow beam communications with the mobile transceiver 21 on the new communication channel, and continues to communicate with and track the mobile transceiver 21 as long as the mobile transceiver is located in the cell 30.

Figure 6:
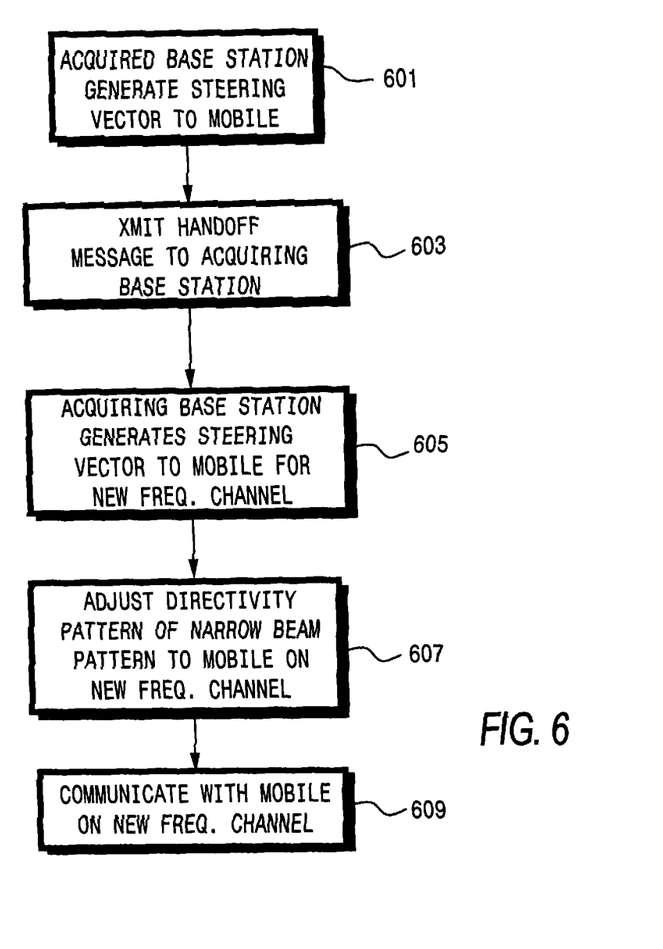
FIG. 6 sets forth a communication flow sequence associated with a third embodiment of the invention, in which the base station of the cell from which the mobile transceiver is about to depart determines the direction of the mobile transceiver and transmits a steering vector associated with this direction to the new base station.

STEERING VECTOR PASSED TO NEW BASE STATION (FIG. 6)

A third embodiment of the handoff control mechanism of the present invention, shown in the channel hand-off flow sequence of FIG. 6, begins at step 601, in which the base station 25 of the current cell 20 from which the mobile transceiver is about to depart into adjacent cell 30 determines the direction of the mobile transceiver 21 relative to the base station 25, and generates a first steering vector associated with this direction. In step 603, this steering vector is conveyed as part of the hand-off initiating message conveyed from the current base station 25 to new base station 35.

In response to this first steering vector message, at step 605, the new base station 35 generates a second steering vector, representative of the direction of the mobile transceiver relative to the base station 35 for a new communication frequency channel to be used between the mobile transceiver 21 and the new base station 35, at channel hand-off. Using this second steering vector, in step 607, base station 35 adjusts the directivity pattern of its phased array antenna, so as to place a narrowbeam pattern of the new communication channel in the direction of mobile transceiver 21.

When the mobile subscriber 21 responds on the new channel, hand-off is complete between the base stations, and the mobile transceiver 21 communicates with the second base station 35 as it enters into and travels through cell 30. In step 609, having completed hand-off and acquired the mobile transceiver 21, the new base station 35 proceeds to conduct narrow beam communications with the mobile transceiver 21 on the new communication channel. Using its phased array antenna, base station 35 then continues to tune its narrowbeam channel, so as to track and communicate with the mobile transceiver 21 as long as the mobile transceiver is located in the cell 30.

Figure 7:
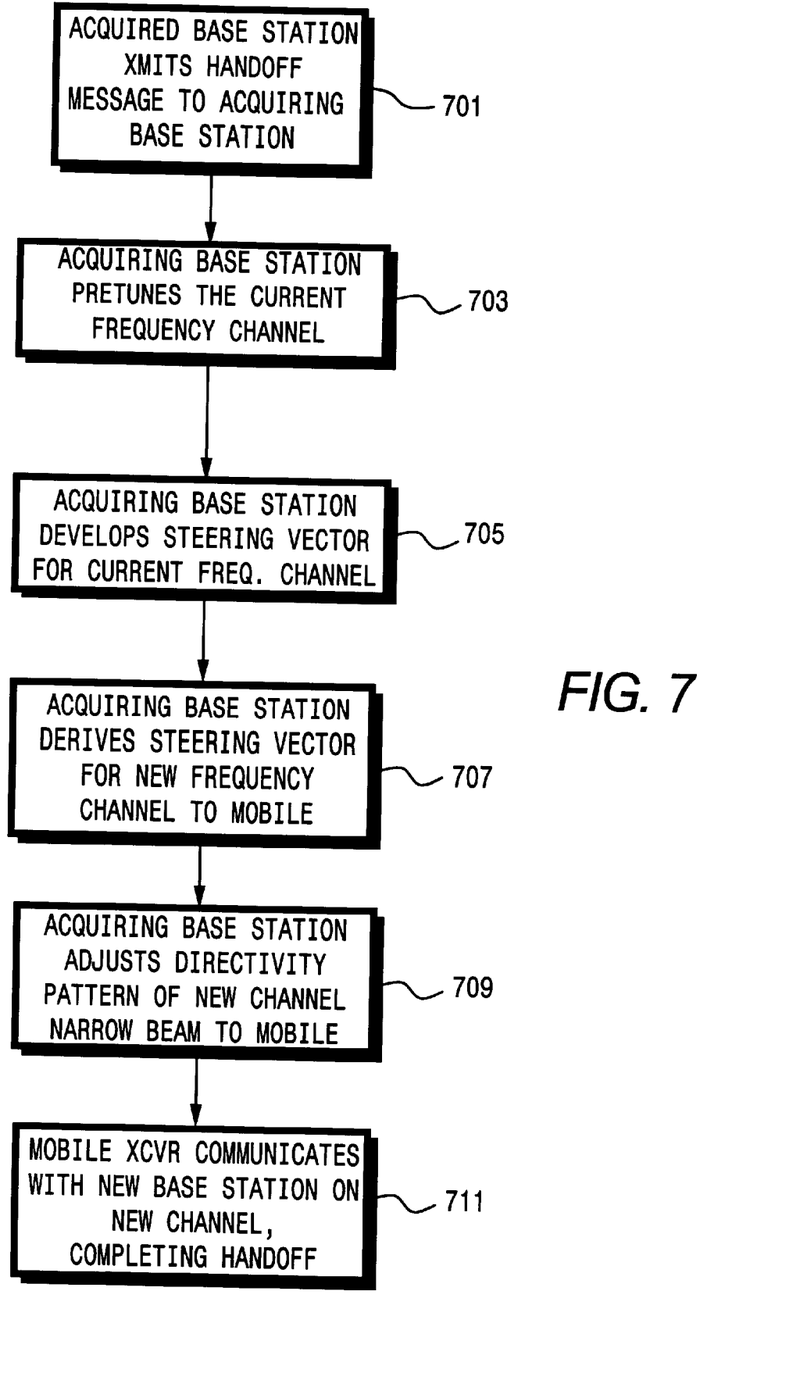
FIG. 7 sets forth a communication flow sequence associated with a fourth embodiment of the present invention, in which the new base station 'pretunes' its transceiver to the 'old' frequency to determine the direction of the mobile subscriber, prior to hand-off.

NEW BASE STATION PRETUNES TO MOBILE SUBSCRIBER (FIG. 7)

A modification of the third embodiment of the frequency allocation control mechanism of the present invention, in which the new base station 35 'pretunes' its transceiver to the 'old' or 'pre hand-off' frequency employed by the current base station 25, in order to determine the direction of the mobile subscriber, prior to channel hand-off, is shown in the channel hand-off flow sequence of FIG. 7. At step 701 (in anticipation of hand off), the base station 25 of the current cell 20 from which the mobile transceiver is about to depart into adjacent cell 30 transmits an orderwire message to the new station 35, that a hand-off is to take place.

In response to this pre hand-off message, at step 703, the new base station 35 in cell 30 uses its phased-array antenna to place a narrow beam pattern (for the current channel being employed by the base station 25 and the base station 35), in the direction of cell 20. In step 705, the new base station 35 monitors the current ('old') channel to derive a steering vector representative of the direction of the mobile transceiver 21 relative to the base station 35. When hand-off occurs, in step 707, the new base station generates a steering vector for the new channel in accordance with that derived for the previous channel. In step 709, acquiring base station 35 uses this new steering vector to place a narrowbeam lobe for the new channel in the direction of the mobile subscriber 21.

When the mobile subscriber 21 responds on the new narrowbeam channel, hand-off is complete between the base stations, and the mobile transceiver 21 communicates with the second base station 35 as it enters into and travels through cell 30. In step 711, having completed hand-off and acquired the mobile transceiver 21, the new base station 35 proceeds to conduct narrow beam communications with the mobile transceiver 21 on the new communication channel. Using its phased array antenna, base station 35 then continues to tune its narrowbeam channel, so as to track and communicate with the mobile transceiver 21 as long as the mobile transceiver is located in the cell 30.

As will be appreciated from the foregoing description, the undesirable usurping of what could otherwise be used for a regular communication channel, as an intermediate construct channel to determine the direction of the mobile transceiver, is effectively obviated by the hand-off mechanism of the present invention, which employs the very same channels for communications between base stations and the mobile transceiver, as the mobile transceiver moves between adjacent cells, to locate the mobile transceiver relative to the base stations, so that the acquiring base station may readily place a narrowbeam channel on the mobile transceiver at hand-off. Each base station employs a phased array antenna, which allows the base station to controllably define its antenna coverage pattern with respect to any mobile transceiver, so as to minimize interference from one or more other transceivers, and thereby reduce frequency reuse distance.

What is claimed is:

1. For use with a cellular wireless communication system having a plurality of geographically distributed cells, each of which contains a respective base station with which one or more mobile transceivers communicate over assigned communication channels, a method of controlling the transfer of a mobile transceiver, communicating over a first communication channel with a first base station of a first cell, to a second communication channel through which said mobile transceiver communicates with a second base station of a second cell, in the course of said mobile transceiver moving from said first cell to said second cell, said method comprising the steps of:

(a) providing antennas at said first and second base stations through which narrowbeam directivity patterns for said first and second communication channels may be directed toward said mobile transceiver; and (b) at said second base station, directing a narrowbeam directivity pattern of said second communication channel from said second base station toward said mobile subscriber in accordance with a steering vector measurement made upon one of said first and second communication channels by one of said first and second base stations.

2. A method according to claim 1, wherein step (b) comprises the steps of:

(b1) transmitting, from said second base station on said second communication channel, a broad beam energy burst that is effective to stimulate said mobile transceiver to transmit on said second communication channel; and (b2) in response to receipt at said second base station of a transmission from said mobile transceiver on said second communication channel, determining the direction of said mobile transceiver relative to said second base station, and adjusting the transmission of energy on said second communication channel from said second base station to a reduced beam width in the direction of said mobile transceiver relative to said second base station.

3. A method according to claim 1, further including the step of:

(c) maintaining communication on said second communication channel between said second base station and said mobile transceiver at a reduced beam width in the direction of said mobile transceiver relative to said second base station, while said mobile transceiver is located in said second cell.

4. A method according to claim 2, wherein step (b1) comprises transmitting said broad beam energy burst as an omnidirectional energy burst relative to said second base station.

5. A method according to claim 2, wherein step (b1) comprises transmitting said broad beam energy burst as a less than omnidirectional energy burst relative to said second base station.

6. A method according to claim 5, wherein step (b1) comprises confining transmission of said broad beam energy burst to a prescribed spatial sector from said second base station toward said first cell.

7. A method according to claim 2, wherein said second base station contains a phased array antenna, by way of which communication with said mobile transceiver is conducted, and wherein step (b1) comprises transmitting said broad beam energy burst as an omnidirectional energy burst from a single antenna element of said phased array antenna.

8. A method according to claim 7, wherein step (b1) comprises transmitting said broad beam energy burst from said single antenna element at a transmission power level of NP, where N is ratio of the average gain of said phased array antenna to the gain of one antenna element of said phased array antenna, and P is the power required for said energy burst to establish a communication link with said mobile transceiver at a boundary of said second cell at the full gain of said phased array antenna.

9. A method according to claim 3, wherein step (c) comprises transmitting over said second communication channel to said mobile transceiver using the reduced beam width obtained by said phased array antenna, in which the average power allocated to each element of said phased array antenna is the power required for said energy burst to establish a communication link with said mobile transceiver at a boundary of said second cell at the full gain of said phased array antenna.

10. A method according to claim 2, wherein said second base station contains a phased array antenna, by way of which transmission of said broad beam energy burst is confined to a prescribed spatial sector from said second base station toward said first cell.

11. A method according to claim 10, wherein step (b1) comprises transmitting said broad beam energy burst from said phased array antenna at a transmission power level of NP/M, where N is ratio of the average gain of said phased array antenna to the gain of one antenna element of said phased array antenna, P is the power required for said energy burst to establish a communication link with said mobile transceiver at a boundary of said second cell at the full gain of said phased array antenna, and M is the ratio of the angle subtended by said prescribed spatial sector to 360°.

12. A method according to claim 11, wherein step (b2) comprises transmitting over said second communication channel to said mobile transceiver using said reduced beam width obtained by said phased array antenna, in which the average power allocated to each element of said phased array antenna is equal to P.

13. A method according to claim 1, wherein step (b) comprises the steps of:

(b1) at said first base station, determining the direction of said mobile transceiver relative to said first base station, and conveying to said second base station first steering vector information representative of the direction of said mobile transceiver relative to said first base station;

(b2) at said second base station, generating a second steering vector, representative of the direction of said mobile transceiver relative to said second base station, in accordance with said first steering vector information conveyed thereto from said first base station; and (b3) transmitting energy on said second communication channel at a confined beam width in said direction of said mobile transceiver relative to said second base station.

14. A method according to claim 13, further including the step of:

(b4) refining said second steering vector, as necessary, while said mobile transceiver is located in said second cell, to maintain communication over said second communication channel between said second base station and said mobile transceiver, at a reduced beam width in the direction of said mobile transceiver relative to said second base station.

15. A method according to claim 13, wherein said second base station contains a phased array antenna, by way of which communication with said mobile transceiver is conducted, and wherein step (b3) comprises transmitting energy on said second communication channel at a confined beam width obtained by said phased array antenna, in said direction of said mobile transceiver relative to said second base station.

16. A method according to claim 1, wherein step (b) comprises the steps of:

at said second base station, (b1) while said mobile transceiver is located in said first cell and is transmitting on said first communication channel, monitoring transmissions therefrom by way of a phased array antenna, and determining therefrom a steering vector representative of the direction of said mobile transceiver relative to said second base station, (b2) tuning a transceiver for conducting communications with said mobile transceiver on said second communication channel, and adjusting parameters of said phased array antenna to form a confined width beam for said second communication channel in said direction of said mobile transceiver relative to said second base station, and (b3) transmitting energy, by way of said phased array antenna, on said second communication channel at said confined width beam in said direction of said mobile transceiver relative to said second base station, and which is effective to stimulate said mobile transceiver to transmit on said second communication channel; and at said mobile transceiver, (b4) in response to receipt of energy transmitted thereto on said second communication channel from said second base station in step (b3), conducting communications with said second base station on said second communication channel.

17. A method according to claim 16, further including the step of:

at said second base station, (b5) refining said steering vector, as necessary, while said mobile transceiver is located in said second cell, to maintain communication over said second communication channel between said second base station and said mobile transceiver, at a reduced width beam in the direction of said mobile transceiver relative to said second base station.

18. For use with a cellular wireless communication system having a plurality of geographically distributed cells, each of which contains a respective base station with which one or more mobile transceivers communicate over assigned communication channels, a method of controlling the transfer of a mobile transceiver, communicating over a first communication channel with a first base station of a first cell, to a second communication channel through which said mobile transceiver communicates with a second base station of a second cell, in the course of said mobile transceiver moving from said first cell to said second cell, said method comprising the steps of:

(a) transmitting, from said second base station on said second communication channel, a broad beam energy burst that is effective to stimulate said mobile transceiver to transmit on said second communication channel;

(b) in response to receipt at said second base station of a transmission from said mobile transceiver on said second communication channel, determining the direction of said mobile transceiver relative to said second base station, and adjusting the transmission of energy on said second communication channel from said second base station to a reduced beam width in the direction of said mobile transceiver relative to said second base station; and (c) thereafter maintaining communication on said second communication channel between said second base station and said mobile transceiver at a reduced beam width in the direction of said mobile transceiver relative to said second base station, while said mobile transceiver is located in said second cell.

19. A method according to claim 18, wherein step (a) comprises transmitting said broad beam energy burst as an omnidirectional energy burst relative to said second base station.

20. A method according to claim 18, wherein step (a) comprises transmitting said broad beam energy burst as a less than omnidirectional energy burst relative to said second base station.

21. A method according to claim 20, wherein step (a) comprises confining transmission of said broad beam energy burst to a prescribed spatial sector from said second base station toward said first cell.

22. A method according to claim 18, wherein said second base station contains a phased array antenna, by way of which communication with said mobile transceiver is conducted, and wherein step (a) comprises transmitting said broad beam energy burst as an omnidirectional energy burst from a single antenna element of said phased array antenna.

23. A method according to claim 22, wherein step (a) comprises transmitting said broad beam energy burst from said single antenna element at a transmission power level of NP, where N is ratio of the average gain of said phased array antenna to the gain of one antenna element of said phased array antenna, and P is the power required for said energy burst to establish a communication link with said mobile transceiver at a boundary of said second cell at the full gain of said phased array antenna.

24. A method according to claim 23, wherein step (b) comprises transmitting over said second communication channel to said mobile transceiver using the reduced beam width obtained by said phased array antenna, in which the average power allocated to each element of said phased array antenna is equal to P.

25. A method according to claim 18, wherein said second base station contains a phased array antenna, by way of which transmission of said broad beam energy burst is confined in step (a) to a prescribed spatial sector from said second base station toward said first cell.

26. A method according to claim 25, wherein step (a) comprises transmitting said broad beam energy burst from said phased array antenna at a transmission power level of NP/M, where N is ratio of the average gain of said phased array antenna to the gain of one antenna element of said phased array antenna, P is the power required for said energy burst to establish a communication link with said mobile transceiver at a boundary of said second cell at the full gain of said phased array antenna, and M is the ratio of the angle subtended by said prescribed spatial sector to 360°.

27. A method according to claim 26, wherein step (b) comprises transmitting over said second communication channel to said mobile transceiver using said reduced beam width obtained by said phased array antenna, in which the average power allocated to each element of said phased array antenna is equal to P.

28. For use with a cellular wireless communication system having a plurality of geographically distributed cells, each of which contains a respective base station with which one or more mobile transceivers communicate over assigned communication channels, a method of controlling the transfer of a mobile transceiver, communicating over a first communication channel with a first base station of a first cell, to a second communication channel through which said mobile transceiver communicates with a second base station of a second cell, in the course of said mobile transceiver moving from said first cell to said second cell, said method comprising the steps of:

(a) at said first base station, determining the direction of said mobile transceiver relative to said first base station, and conveying to said second base station first steering vector information representative of the direction of said mobile transceiver relative to said first base station; and (b) at said second base station, generating a second steering vector, representative of the direction of said mobile transceiver relative to said second base station, in accordance with said first steering vector information conveyed thereto from said first base station; and (c) transmitting energy on said second communication channel at a confined beam width in said direction of said mobile transceiver relative to said second base station.

29. A method according to claim 28, further including (d) refining said second steering vector, as necessary, while said mobile transceiver is located in said second cell, to maintain communication over said second communication channel between said second base station and said mobile transceiver, at a reduced beam width in the direction of said mobile transceiver relative to said second base station.

30. A method according to claim 28, wherein said second base station contains a phased array antenna, by way of which communication with said mobile transceiver is conducted, and wherein step (c) comprises transmitting energy on said second communication channel at a confined beam width obtained by said phased array antenna, in said direction of said mobile transceiver relative to said second base station.

31. For use with a cellular wireless communication system having a plurality of geographically distributed cells, each of which contains a respective base station with which one or more mobile transceivers communicate over assigned communication channels, a method of controlling the transfer of a mobile transceiver, communicating over a first communication channel with a first base station of a first cell, to a second communication channel through which said mobile transceiver communicates with a second base station of a second cell, in the course of said mobile transceiver moving from said first cell to said second cell, said method comprising the steps of:

at said second base station, (a) while said mobile transceiver is located in said first cell and is transmitting on said first communication channel, monitoring transmissions therefrom by way of a phased array antenna, and determining therefrom a steering vector representative of the direction of said mobile transceiver relative to said second base station, (b) tuning a transceiver for conducting communications with said mobile transceiver on said second communication channel, and adjusting parameters of said phased array antenna to form a confined width beam for said second communication channel in said direction of said mobile transceiver relative to said second base station, and (c) transmitting energy, by way of said phased array antenna, on said second communication channel at said confined width beam in said direction of said mobile transceiver relative to said second base station, and which is effective to stimulate said mobile transceiver to transmit on said second communication channel; and at said mobile transceiver, (d) in response to receipt of energy transmitted thereto on said second communication channel from said second base station in step (c), conducting communications with said second base station on said second communication channel.

32. A method according to claim 31, further including the step of:

at said second base station, (e) refining said steering vector, as necessary, while said mobile transceiver is located in said second cell, to maintain communication over said second communication channel between said second base station and said mobile transceiver, at a reduced width beam in the direction of said mobile transceiver relative to said second base station.

\* \* \* \* \*